(12) United States Patent
Krause Perin et al.

(10) Patent No.: US 11,262,437 B1
(45) Date of Patent: Mar. 1, 2022

(54) TECHNIQUES TO COMPENSATE FOR MIRROR DOPPLER SPREADING IN COHERENT LIDAR SYSTEMS BY CONVOLUTION

(71) Applicant: AEVA, INC., Mountain View, CA (US)

(72) Inventors: Jose Krause Perin, Mountain View, CA (US); Mina Rezk, Haymarket, VA (US); Kumar Bhargav Viswanatha, Santa Clara, CA (US); Rajendra Tushar Moorti, Mountain View, CA (US)

(73) Assignee: Aeva, Inc., Mountain View, CA (US)

( * ) Notice: Subject to any disclaimer, the term of this patent is extended or adjusted under 35 U.S.C. 154(b) by 0 days.

(21) Appl. No.: 17/503,105

(22) Filed: Oct. 15, 2021

Related U.S. Application Data

(60) Provisional application No. 63/093,599, filed on Oct. 19, 2020.

(51) Int. Cl.
*G01C 3/08* (2006.01)
*G01S 7/48* (2006.01)
*G01S 17/32* (2020.01)
*G01S 17/58* (2006.01)

(52) U.S. Cl.
CPC ............ *G01S 7/4808* (2013.01); *G01S 17/32* (2013.01); *G01S 17/58* (2013.01)

(58) Field of Classification Search
CPC ......... G01S 7/4808; G01S 17/32; G01S 17/58
See application file for complete search history.

(56) References Cited

U.S. PATENT DOCUMENTS

| 10,422,880 B2 * | 9/2019 | Crouch | G01S 7/487 |
| 10,690,773 B2 * | 6/2020 | Gunnam | G01S 17/86 |
| 2021/0109219 A1 * | 4/2021 | Onori | G01S 7/4808 |

* cited by examiner

*Primary Examiner* — Samantha K Nickerson
*Assistant Examiner* — Sanjida Naser
(74) *Attorney, Agent, or Firm* — Womble Bond Dickinson (US) LLP (57) ABSTRACT

A first signal is sampled at the LiDAR system to produce a first set of samples around a first detected frequency peak related to the first signal. A second signal is sampled at the LiDAR system to produce a second set of samples around a second detected frequency peak related to the second signal. A first function based on the first set of samples and a second function based on the second set of samples are created. The first and second functions are convolved to produce a third function. Provided an index of a convolution peak value is the same as a first peak index, it is determined not to refine the first signal or the second signal. Provided the index of the convolution peak value is not the same as the first peak index, at least one of the first signal or the second signal is refined.

15 Claims, 9 Drawing Sheets

TECHNIQUES TO COMPENSATE FOR MIRROR DOPPLER SPREADING IN COHERENT LIDAR SYSTEMS BY CONVOLUTION

RELATED APPLICATIONS

This application claims priority from and the benefit of U.S. Provisional Patent Application No. 63/093,599 filed on Oct. 19, 2020, the entire contents of which are incorporated herein by reference in their entirety.

TECHNICAL FIELD

The present disclosure relates generally to light detection and ranging (LiDAR) systems, for example, techniques to compensate for mirror Doppler spreading in coherent LiDAR systems.

BACKGROUND

Frequency-Modulated Continuous-Wave (FMCW) LiDAR systems include several possible phase impairments such as laser phase noise, circuitry phase noise, flicker noise that the driving electronics inject on a laser, drift over temperature/weather, and chirp rate offsets. A scanning FMCW LiDAR system may use a moving scanning mirror to steer light beams and scan a target or a target environment. To achieve a wide field of view and high frame rates, the scanning mirror may have a high angular speed. The high mirror angular speed may cause several impairments. For example, the mirror-induced Doppler shift may broaden the received signal bandwidth. The received signal intensity may be lowered, and consequently the detection probability may be reduced. Thus, the error in range, velocity, and reflectivity measurements may be increased.

SUMMARY

The present disclosure describes various examples, without limitation, methods of processing signal in LiDAR systems.

In some examples, disclosed herein is a method for determining range and velocity information related to a target in a light detection and ranging (LiDAR) system. In this approach, the signal in frequency domain is convolved/correlated with another signal that undergoes the same mirror-induced Doppler shift. For example, in a LiDAR system employing two optical sources, one optical source may serve as the primary input to generate the primary signal, while the other optical source may serve as the secondary input to generate the secondary signal. Once the detection is made on both the primary signal and the secondary signal, L samples may be taken around the respective peak from each signal. The samples of the primary signal and the samples of the secondary signal may be convolved to form a convolution signal in the interval [−L, L]. The index of the maximum or peak value of the convolution signal may be used to refine the location (e.g., frequency) of the peaks of the primary signal and/or the secondary signal. In this way, the measured error due to the frequency spreading caused by mirror-induced Doppler may be improved. Thus, more accurate frequency and energy measurements may be achieved, thereby increasing the accuracy in range, velocity, and reflectivity measurements of the target. For example, range and velocity may be extracted from the x-axis (frequency) information, while reflectivity may be extracted from the y-axis (energy) information.

In some examples, a method for determining range and velocity information related to a target in a LiDAR system is disclosed herein. A first signal is sampled at the LiDAR system to produce a first set of samples around a first detected frequency peak related to the first signal, the first detected frequency peak corresponding to a first peak index. A second signal is sampled at the LiDAR system to produce a second set of samples around a second detected frequency peak related to the second signal, the second detected frequency peak corresponding to a second peak index being the same as the first peak index. A first function based on the first set of samples and a second function based on the second set of samples are created. The first and second functions are convolved to produce a third function, where the third function comprises a convolution peak value corresponding to an index of the convolution peak value. Provided the index of the convolution peak value is the same as the first peak index, it is determined not to refine the first signal or the second signal. Provided the index of the convolution peak value is not the same as the first peak index, at least one of the first signal or the second signal is refined to produce at least one of a first refined signal or a second refined signal based on a difference between the index of the convolution peak value and the first peak index. Range and velocity information related to a target is extracted based on at least one of the first refined signal or the second refined signal.

In some examples, a LiDAR system is disclosed herein. The LiDAR system comprises a processor and a memory to store instructions that, when executed by the processor, cause the system to sample a first signal at the LiDAR system to produce a first set of samples around a first detected frequency peak related to the first signal, the first detected frequency peak corresponding to a first peak index; sample a second signal at the LiDAR system to produce a second set of samples around a second detected frequency peak related to the second signal, the second detected frequency peak corresponding to a second peak index being the same as the first peak index; create a first function based on the first set of samples and a second function based on the second set of samples; convolve the first and second functions to produce a third function, wherein the third function comprises a convolution peak value corresponding to an index of the convolution peak value. Provided the index of the convolution peak value is the same as the first peak index, the system is to determine not to refine the first signal or the second signal; provided the index of the convolution peak value is not the same as the first peak index, the system is to refine at least one of the first signal or the second signal to produce at least one of a first refined signal or a second refined signal based on a difference between the index of the convolution peak value and the first peak index. The system is further to extract range and velocity information related to a target based on at least one of the first refined signal or the second refined signal.

In some examples, a LiDAR system is disclosed herein. The LiDAR system comprises a first optical source to transmit a portion of a first light signal towards a target; a second optical source to transmit a portion of a second light signal towards a target; an optical receiver to receive a first return signal from the target based on the first light signal and a second return signal from the target based on the second light signal. The LiDAR system further comprises a circuitry; and a memory to store instructions that, when executed by the circuitry, cause the system to: sample the first return signal at the LiDAR system to produce a first set of samples around a first detected frequency peak related to the first return signal, the first detected frequency peak corresponding to a first peak index; sample the second return signal at the LiDAR system to produce a second set of samples around a second detected frequency peak related to the second return signal, the second detected frequency peak corresponding to a second peak index being the same as the first peak index; create a first function based on the first set of samples and a second function based on the second set of samples; convolve the first and second functions to produce a third function, wherein the third function comprises a convolution peak value corresponding to an index of the convolution peak value. Provided the index of the convolution peak value is the same as the first peak index, the LiDAR system is to determine not to refine the first return signal or the second return signal; provided the index of the convolution peak value is not the same as the first peak index, the LiDAR system is to refine at least one of the first return signal or the second return signal to produce at least one of a first refined return signal or a second refined return signal based on a difference between the index of the convolution peak value and the first peak index. The LiDAR system is further to extract range and velocity information related to a target based on at least one of the first refined return signal or the second refined return signal.

These and other aspects of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and examples, should be viewed as combinable unless the context of the disclosure clearly dictates otherwise.

It will therefore be appreciated that this Summary is provided merely for purposes of summarizing some examples so as to provide a basic understanding of some aspects of the disclosure without limiting or narrowing the scope or spirit of the disclosure in any way. Other examples, aspects, and advantages will become apparent from the following detailed description taken in conjunction with the accompanying figures which illustrate the principles of the described examples.

BRIEF DESCRIPTION OF THE DRAWINGS

For a more complete understanding of various examples, reference is now made to the following detailed description taken in connection with the accompanying drawings in which like identifiers correspond to like elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

The described LiDAR systems herein may be implemented in any sensing market, such as, but not limited to, transportation, manufacturing, metrology, medical, virtual reality, augmented reality, and security systems. According to some embodiments, the described LiDAR system may be implemented as part of a front-end of frequency modulated continuous-wave (FMCW) device that assists with spatial awareness for automated driver assist systems, or self-driving vehicles.

Figure 1A:
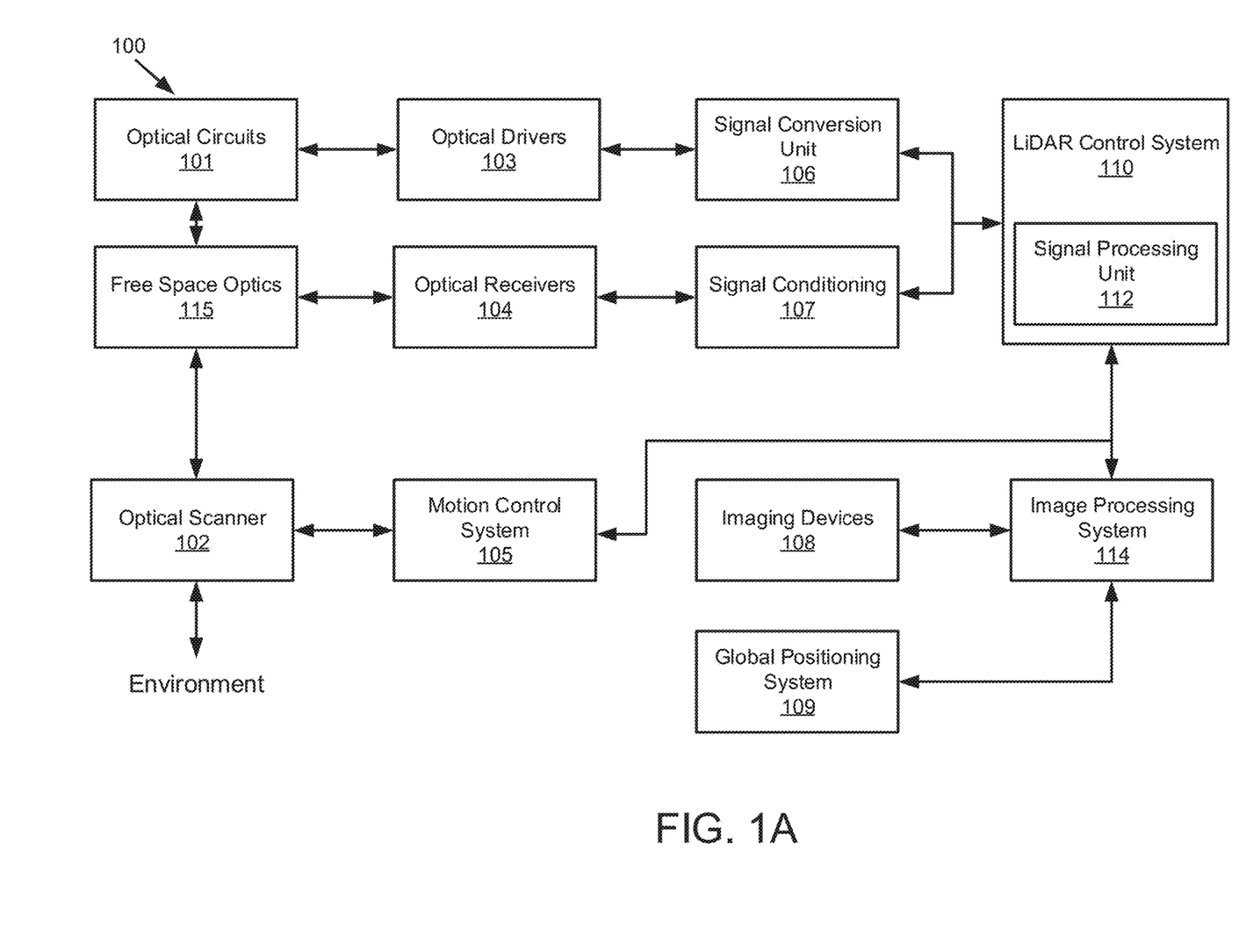
FIG. 1A is a block diagram illustrating an example LiDAR system according to embodiments of the present disclosure.

FIG. 1A is a diagram illustrating a LiDAR system 100 according to example implementations of the present disclosure. The LiDAR system 100 includes one or more of each of a number of components, but may include fewer or additional components than shown in FIG. 1. According to some embodiments, one or more of the components described herein with respect to LiDAR system 100 can be implemented on a photonics chip. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles.

In some examples, the LiDAR system 100 includes an optical scanner 102 that includes one or more scanning mirrors that are rotatable along an axis (e.g., a slow-moving-axis) that is orthogonal or substantially orthogonal to the fast-moving-axis of the diffractive element to steer optical signals to scan a target environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coating window or the like.

To control and support the optical circuits 101 and optical scanner 102, the LiDAR system 100 includes LiDAR control systems 110. The LiDAR control systems 110 may include a processing device for the LiDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LiDAR control systems 110 may include a signal processing unit 112 such as a digital signal processor (DSP). The LiDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LiDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LiDAR control systems 110 to signals interpretable by the galvanometers in the optical scanner 102. In some examples, a motion control system 105 may also return information to the LiDAR control systems 110 about the position or operation of components of the optical scanner 102. For example, an analog-to-digital converter may in turn convert information about the galvanometers' position to a signal interpretable by the LIDAR control systems 110.

The LiDAR control systems 110 are further configured to analyze incoming digital signals. In this regard, the LiDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LiDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LiDAR control systems 110. In some examples, the signals from the optical receivers 104 may be subject to signal conditioning by signal conditioning unit 107 prior to receipt by the LiDAR control systems 110. For example, the signals from the optical receivers 104 may be provided to an operational amplifier for amplification of the received signals and the amplified signals may be provided to the LIDAR control systems 110.

In some applications, the LiDAR system 100 may additionally include one or more imaging devices 108 configured to capture images of the environment, a global positioning system 109 configured to provide a geographic location of the system, or other sensor inputs. The LiDAR system 100 may also include an image processing system 114. The image processing system 114 can be configured to receive the images and geographic location, and send the images and location or information related thereto to the LiDAR control systems 110 or other systems connected to the LIDAR system 100.

In operation according to some examples, the LiDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LiDAR control systems 110. The LiDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal.

Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LiDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 1B:
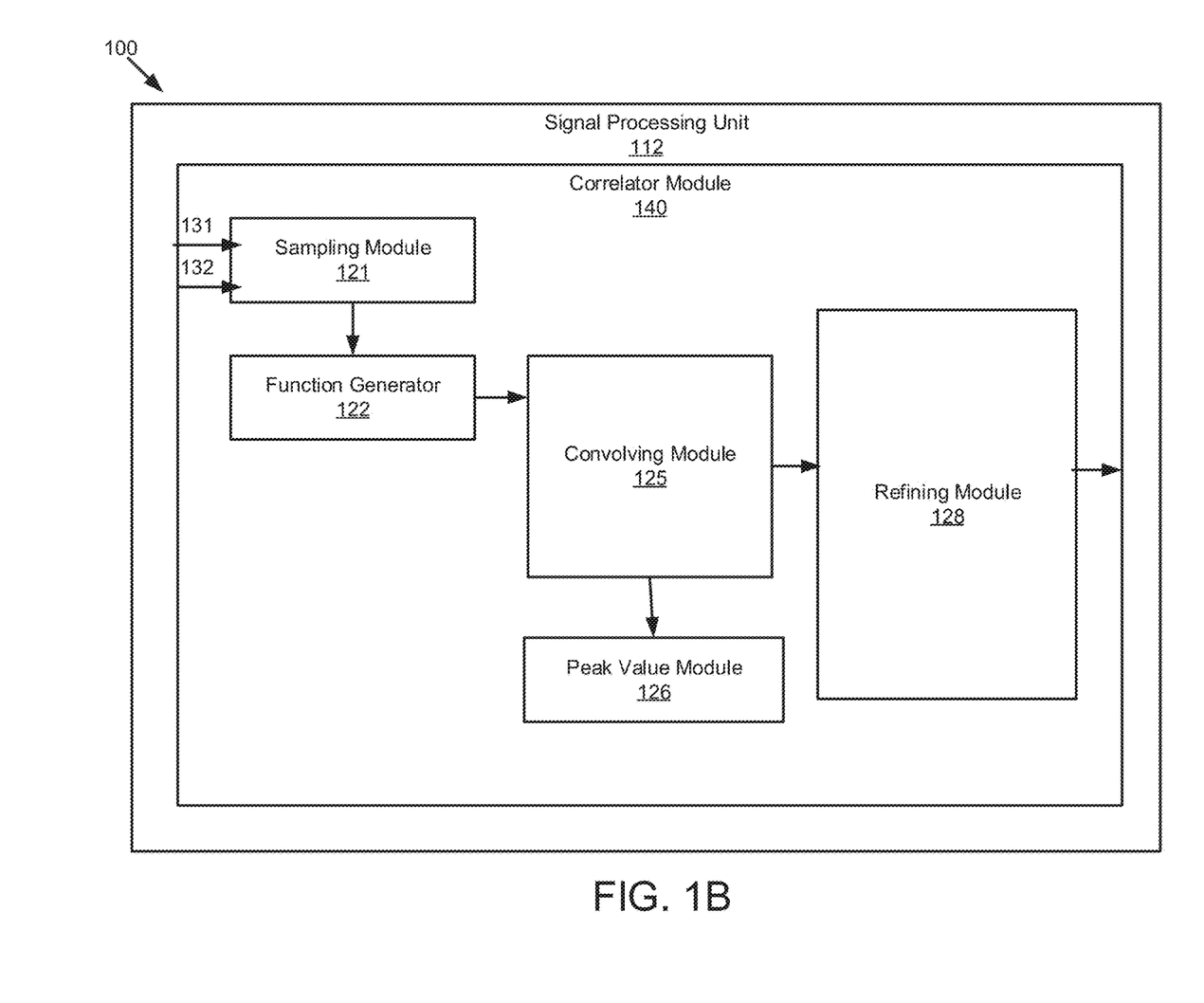
FIG. 1B is a block diagram illustrating an example of a convolution module of a LiDAR system according to embodiments of the present disclosure.

FIG. 1B is a block diagram illustrating an example of a correlator module 140 of the LiDAR system 100 according to embodiments of the present disclosure. Referring to FIG. 1A and FIG. 1B, the signal processing unit 112 may include the correlator module 140. It should be noted that, although the correlator module is depicted as residing within the signal processing unit 112, embodiments of the present disclosure are not limited as such. For instance, in one embodiment, the correlator module 140 can reside in computer memory (e.g., RAM, ROM, flash memory, and the like) within system 100 (e.g., LiDAR control system 110). The correlator module 140 may include, but not being limited to, a sampling module 121, a function generator 122, a convolving module 125, a peak value module 126 and a refining module 128. In some embodiments, the correlator module 140 may receive signals from one or two optical sources through the optical receivers 104 or the signal conditioning unit 107 depicted in FIG. 1A.

The sampling module 121 may be configured to sample a signal 131 at the LiDAR system 100 to produce a set of samples around a detected frequency peak related to the signal. For example, the sampling module 121 may receive a primary signal, which may be a primary input from an optical source. Once the detection is made on the primary signal, L samples may be taken around the peak from the primary signal to produce the primary signal samples.

The function generator 122 may be configured to create a function based on the samples from the sampling module 121. For example, the function generator 122 may create a first function based on the primary signal samples.

The sampling module 121 may be further configured to sampling another signal 132 at the LiDAR system 100 to produce another set of samples around another detected frequency peak related to the another signal. For example, the sampling module 121 may receive a secondary signal, which may be a secondary input from another optical source or the same optical source of the primary input. Once the detection is made on the secondary signal, L samples may be taken around the peak from the secondary signal to produce the secondary signal samples. The index of the samples from the detected frequency peak in the primary signal and the index of the samples from the detected frequency peak in the secondary signal may be set to be the same. For example, both the detected frequency peak in the primary signal samples and the detected frequency peak in the secondary signal samples may have an index of zero.

The function generator 122 may be further configured to create another function based on the another set of samples from the sampling module 121. For example, the function generator 122 may create a second function based on the secondary signal samples.

The convolving module 125 may be configured to convolve the first function and the second function created by the function generator 122 to produce a convolved function (convolution). For example, these L samples, the L primary signal samples and the L secondary signal samples, are convolved to form a signal in the interval [−L, L].

The peak value module 126 may be configured to search for a convolution peak value of the convolved function output. The index of the max value of the convolution output (A) can be used to refine the location of the peaks. For example, if the convolved peak falls at sample zero (Δ=0), the detection cannot be refined. If the convolved peak falls at location+2 (Δ=+2), then the peak of the primary signal or the secondary signal may be shifted by Δ/2. The signal processing unit may be configured to extract range and velocity information of the target from the refined signal. The correlator module 140 may include other modules. Some or all of modules 121, 122, 125, 126, 128 may be implemented in software, hardware, or a combination thereof. For example, these modules may be loaded into a memory, and executed by one or more processors. Some of modules 121-128 may be integrated together as an integrated module.

The LiDAR system 100 may use a moving scanning mirror (e.g., included in optical scanner 102) to steer light beams and scan a target or a target environment. Objects in the target environment may scatter an incident light into a return optical beam or a target return signal. The optical scanner 102 also collects the return optical beam or the target return signal. The target return signal may be mixed with a second signal from a local oscillator, and a range dependent beat frequency may be generated. The temporal phase difference between the two waveforms may generate the beat frequency measured on the optical receivers 104 (photodetectors). In one embodiment, the beat frequency may be digitized by an analog-to-digital converter (ADC), for example, in a signal conditioning unit such as signal conditioning unit 107 in LiDAR system 100. In one embodiment, the digitized beat frequency signal may be received by the signal processing unit 112 LiDAR system 100, and then be digitally processed in the signal processing unit 112. The signal processing unit 112 including the correlator module 140 may process the received signal to extract range and velocity information of the target.

Figure 1C:
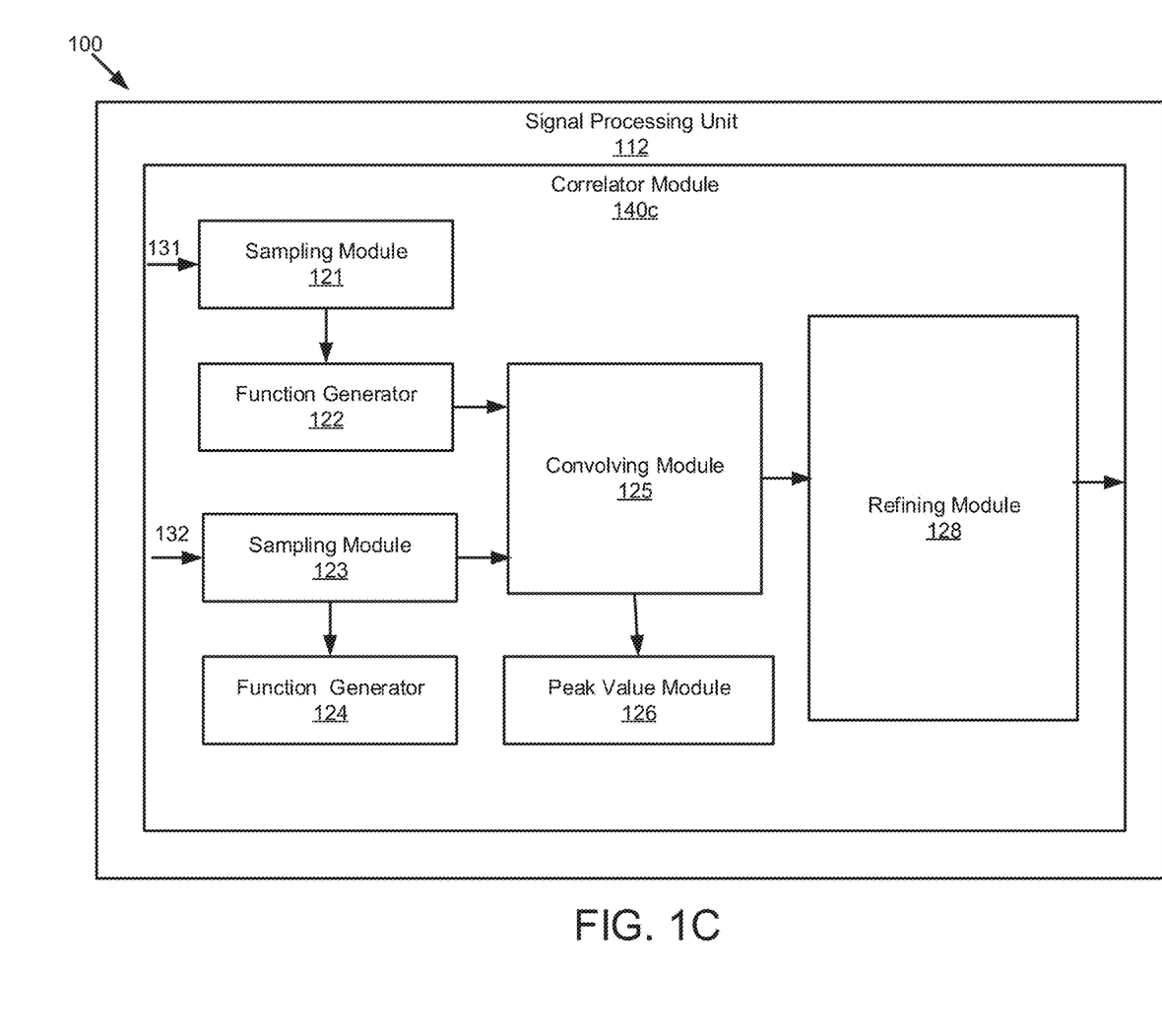
FIG. 1C is a block diagram illustrating an example of a convolution module of a LiDAR system according to embodiments of the present disclosure.

FIG. 1C is a block diagram illustrating another example of a correlator module 140c of the LiDAR system 100 according to embodiments of the present disclosure. Referring to FIG. 1A and FIG. 1C, the signal processing unit 112 may include the correlator module 140c. In some embodiments, the correlator module 140c may include a sampling module 121, a function generator 122, a sampling module 123 and a function generator 124, a convolving module 125, a peak value module 126 and a refining module 128, as depicted in FIG. 1C. The sampling module 121 may be configured to sample the signal 131 at the LiDAR system 100 to produce a set of samples around a detected frequency peak related to the signal. For example, the sampling module 121 may receive a primary signal, which may be a primary input from an optical source. The function generator 122 may be configured to create a function based on the samples from the sampling module 121. For example, the function generator 122 may create a function based on the primary signal samples. The sampling module 123 may be configured to sampling another signal 132 at the LiDAR system 100 to produce another set of samples around another detected frequency peak related to the another signal. For example, the sampling module 123 may receive a secondary signal, which may be a secondary input from another optical source or the same optical source of the primary input. For example, the sampling module 121 may receive a primary signal and the sampling module 123 may receive a secondary signal in parallel. The function generator 124 may be further configured to create another function based on the another set of samples from the sampling module 123. For example, the function generator 124 may create a function based on the secondary signal samples. For example, the function generator 122 may create a function and the function generator 124 may create a function in parallel. The convolving module 125 may be configured to convolve the function created by the function generator 122 and the function created by the function generator 124 to produce a convolved function (convolution). For example, these L samples, the L primary signal samples and the L secondary signal samples, are convolved to form a signal in the interval [−L, L].

Figure 2:
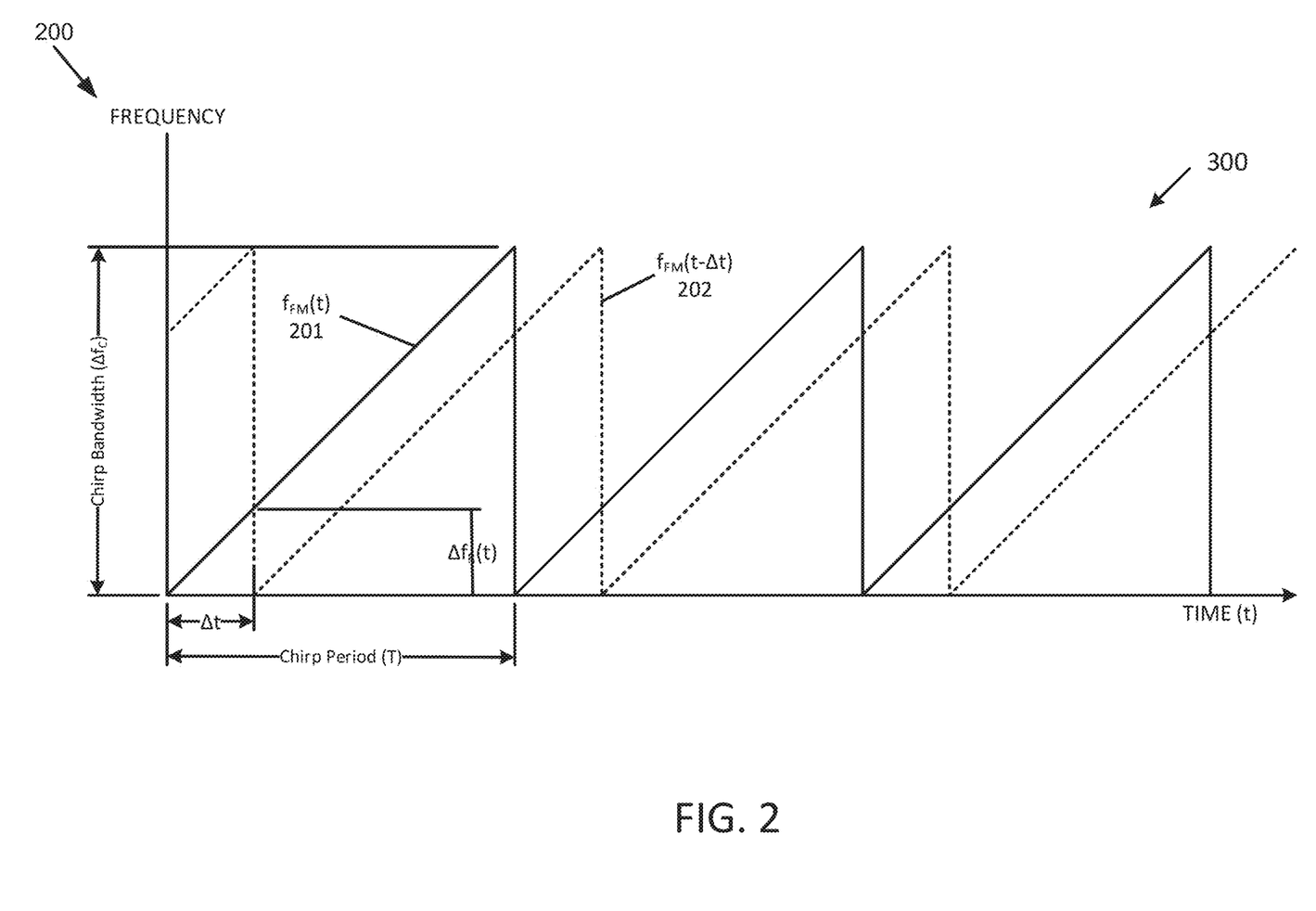
FIG. 2 is a time-frequency diagram illustrating an example of FMCW LIDAR waveforms according to embodiments of the present disclosure.

FIG. 2 is a time-frequency diagram 200 of an FMCW scanning signal 101b that can be used by a LiDAR system, such as system 100, to scan a target environment according to some embodiments. In one example, the scanning waveform 201, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 2 also depicts target return signal 202 according to some embodiments. Target return signal 202, labeled as $f_{FM}(t-\Delta t)$, is a time-delayed version of the scanning signal 201, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3A:
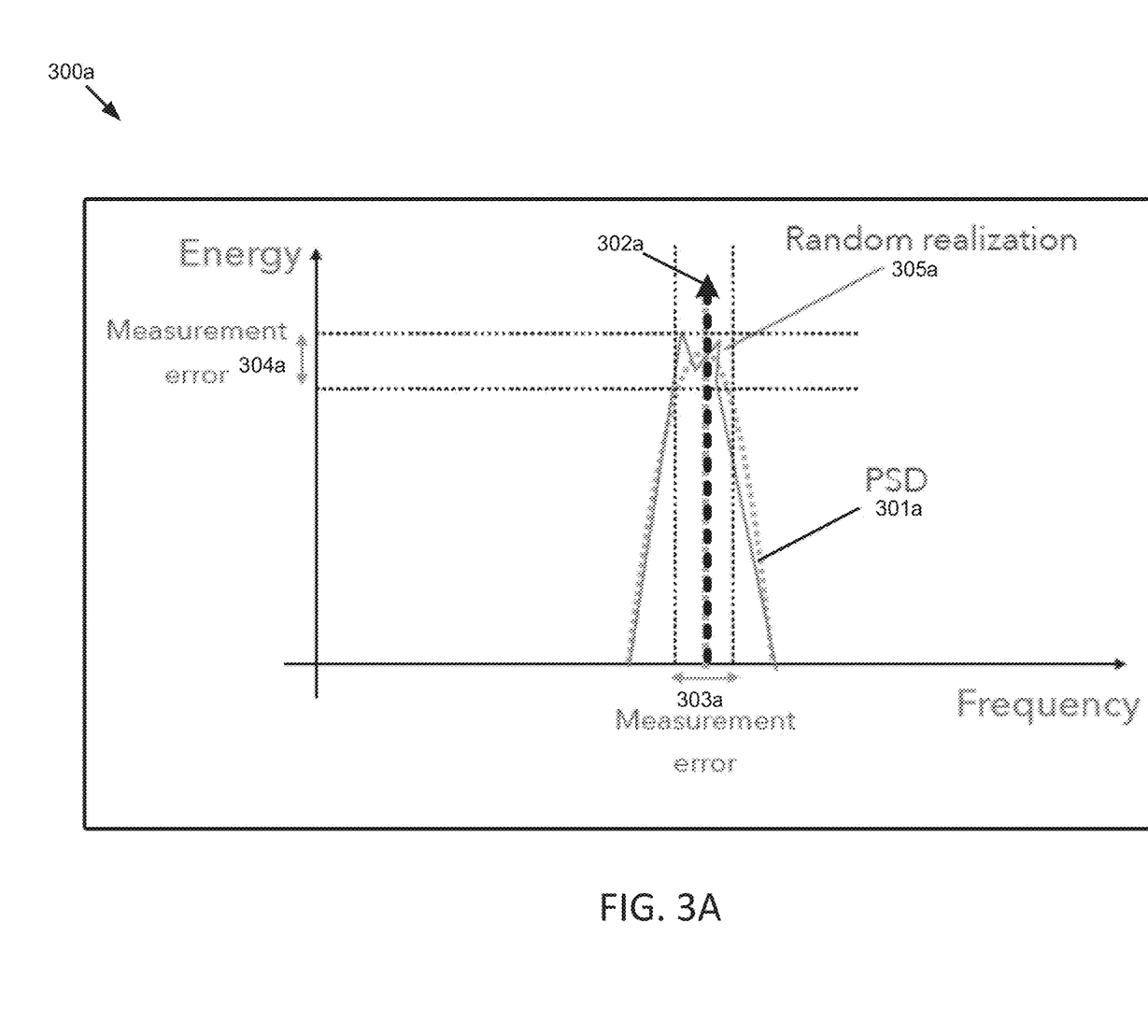
FIG. 3A is a diagram illustrating an example of a received signal power spectrum density (PSD) in a LiDAR system, when the scanning mirror has a low speed, according to embodiments of the present disclosure.
Figure 3B:
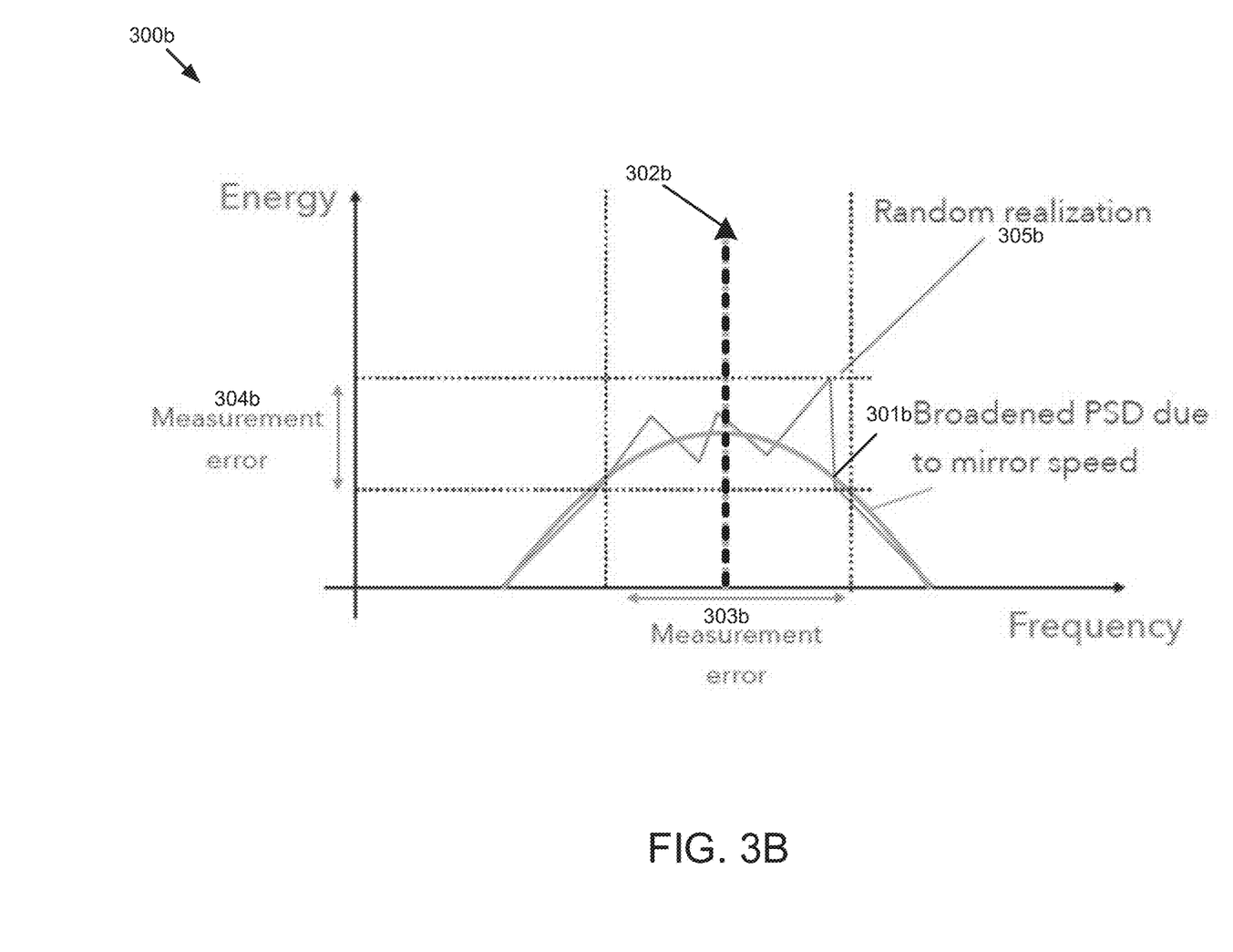
FIG. 3B is a diagram illustrating an example of received signal power spectrum density (PSD) in a LiDAR system, when the scanning mirror has a high speed, according to embodiments of the present disclosure.

FIG. 3A is a diagram 300a illustrating an example of received signal power spectrum density (PSD) 301a in a LiDAR system, when the scanning mirror has a low speed. FIG. 3B is a diagram illustrating an example of received signal power spectrum density (PSD) in a LiDAR system, when the scanning mirror has a high speed. A scanning LiDAR system (e.g., FMCW LiDAR) may use a moving scanning mirror to steer light beams and scan a target or a target environment. To achieve a wide field of view and high frame rates, the scanning mirror may have a high angular speed. In some scenarios, the high mirror angular speed may cause several impairments. For example, the mirror-induced Doppler shift may broaden the received signal bandwidth. As such, in these scenarios, the received signal intensity may be lowered, and consequently the detection probability may be reduced and cause an increase in errors related to range, velocity, and reflectivity measurements.

Referring to FIG. 3A and FIG. 3B, the moving scanning mirror (e.g., scanning mirror included as part of system 100 in FIG. 1) may induce Doppler shift on the outgoing light beam and the incoming light beam, which may be the target return signal. As depicted in FIG. 3A, when the scanning mirror is moving at lower speeds (e.g., <5 kdeg/s), the mirror-induced Doppler has little impact on the signal quality. The peak value 302a may be detected in the PSD 301a of the received signal. The received signal may have random realization 305a, which may be minor. The received signal may have a reasonable range of frequency measurement error 303a and a reasonable range of power measurement error 304a.

As depicted in FIG. 3B, when the scanning mirror is moving at a high mirror speeds (>5 kdeg/s), there may be a significant broadening of the signal power spectrum density (PSD) 301b. As a result, the measured signal energy may be lower on average. Thus, the probability of detection may be consequently reduced. The measurement error on frequency 303b and/or the measurement error on energy 304b may be higher due to the randomness (e.g., random realization) of the signal. For example, the detected signal peak 305b may be offset from the location (e.g., frequency) of the true signal peak 302b of the PSD 301b.

To address the above problem, the embodiments described herein can be configured to enable the signal in frequency domain to be convolved/correlated with another signal that undergoes the same mirror-induced Doppler shift. For example, in a LiDAR system, a primary signal may be generated from a primary input from an optical source, while a secondary signal may be generated from a secondary input from another optical source or the same optical source. Once the detection is made on both the primary signal and the secondary signal, L samples may be taken around the respective peak from each signal. The samples of the primary signal and the samples of the secondary signal may be convolved to form a convolution signal in the interval [−L, L]. The index of the maximum or peak value of the convolution signal may be used to refine the location (e.g., frequency) of the peaks of the primary signal and/or the secondary signal. In this way, the measured error due to the frequency spreading caused by mirror-induced Doppler may be improved. Thus, more accurate frequency and energy measurements may be achieved, thereby increasing the accuracy in range, velocity, and reflectivity measurements of the target. For example, range and velocity may be extracted from the x-axis (frequency) information, while reflectivity may be extracted from the y-axis (energy) information.

Figure 4:
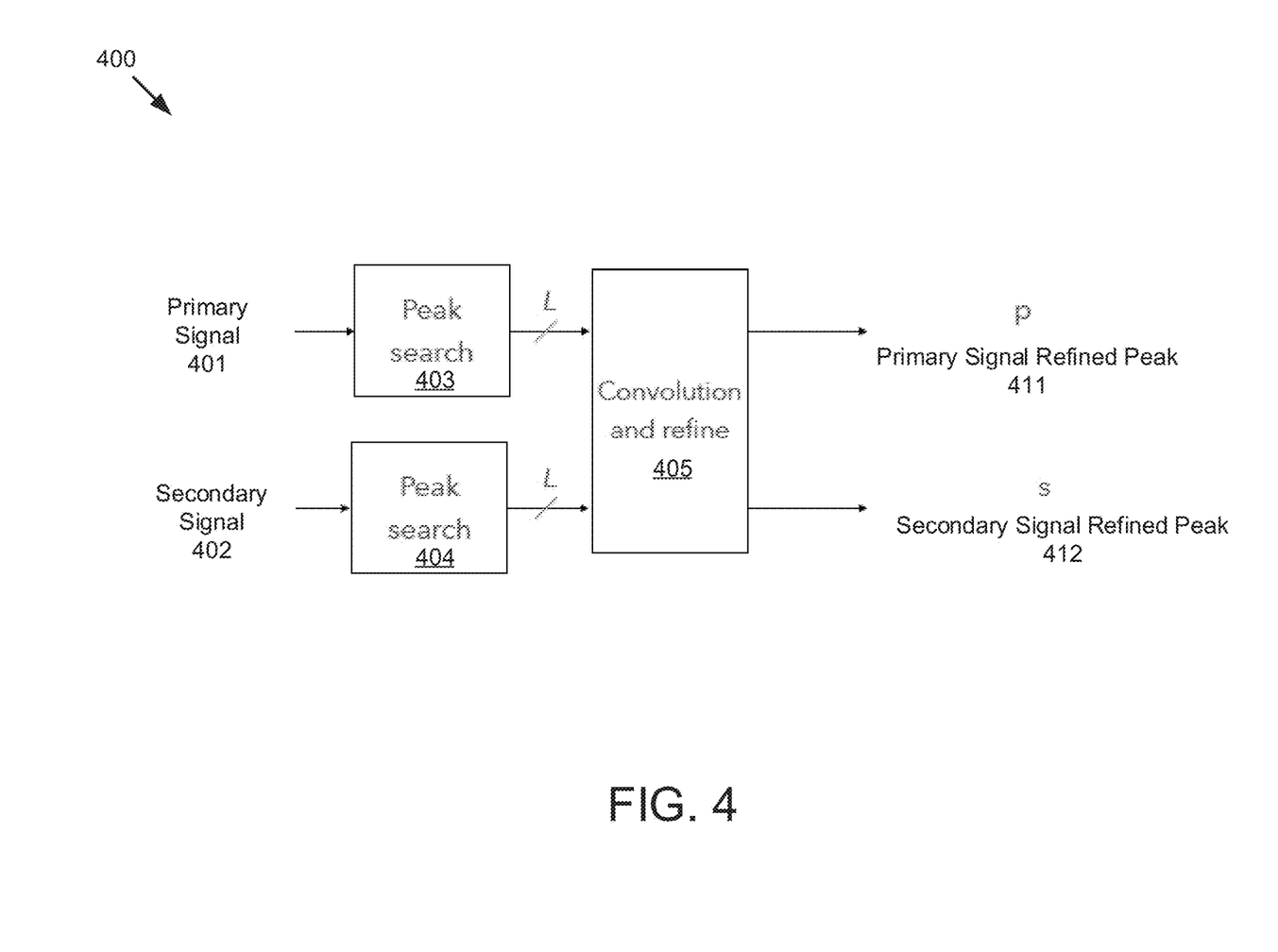
FIG. 4 is a flow diagram illustrating an example of refining the detected signals by convolving a primary signal and a secondary signal of a LiDAR system according to embodiments of the present disclosure.

FIG. 4 is a flow diagram 400 illustrating an example of refining the detected signals by convolving a primary signal and a secondary signal of a LiDAR system according to embodiments of the present disclosure. The embodiments described herein provide multiple approaches to combat mirror Doppler spreading. For example, frequency domain techniques and time domain techniques can be employed by embodiments. One approach in the frequency domain techniques includes compensating mirror Doppler spreading by convolution. In this approach, the primary signal in frequency domain is convolved/correlated with the secondary or reference signal that undergoes the same mirror-induced Doppler shift.

As depicted in FIG. 4, the detection may be made on both the primary signal 401 and the secondary signal 402. After the primary signal 401 is detected, the primary signal may form an input primary spectrum. After the secondary or reference signal 402 is detected, the secondary or reference signal 402 may form an input secondary or reference spectrum. The secondary or reference spectrum may be obtained in many different ways. In one example, a LiDAR system may employ two optical sources. One optical source may serve as the primary input to generate the primary spectrum, while the other optical source may serve as the secondary input to generate the secondary/reference spectrum. In another example, an optical source may serve as the primary input to generate the primary spectrum by using up-chirping signals and serve as the secondary input to generate the secondary/reference spectrum by using down-chirping signals. In yet another example, the primary and secondary inputs may come from the same optical source but at different times, e.g., the primary and secondary inputs could be consecutive measurements of the same optical source.

Figure 5A:
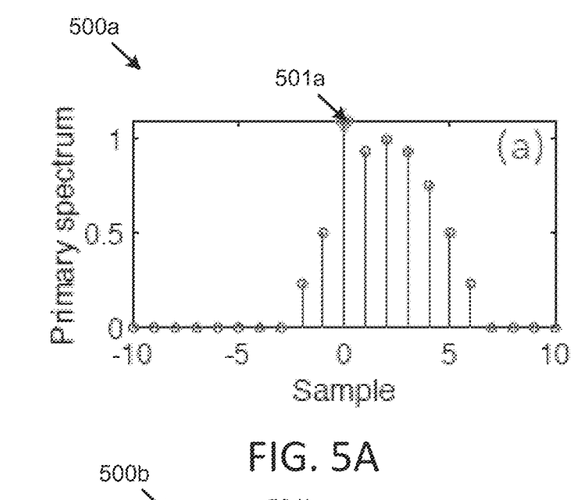
FIGS. 5A-5C are diagrams illustrating an example of convolution of a primary signal and a secondary signal of a LiDAR system according to embodiments of the present disclosure.
Figure 5B:
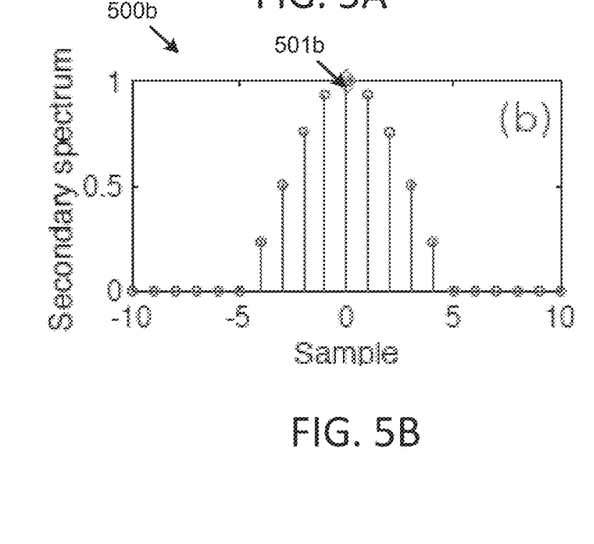
Figure 5C:
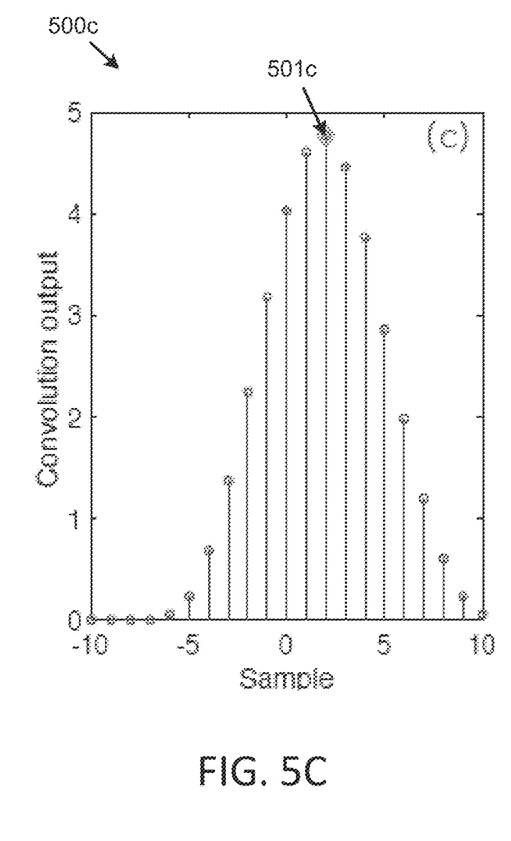

As depicted at 403, a peak search may be performed to find a peak value of the primary signal in the primary spectrum, which is the detected maximum primary signal value. The primary signal 401 may be sampled to produce a set of samples of the primary signal. For example, each of the set of samples of the primary signal may have a corresponding index (e.g., as depicted in FIGS. 5A-5C). L samples may be taken around the peak value of the primary signal. For example, samples around the peak value of the primary signal may be taken for post processing, e.g., fast Fourier transform (FFT) processing. The samples around the peak value of the primary signal may be within 1, 2, 3, 5, or 10 megahertz around the peak value of the primary signal, for example. Assuming an index of the primary peak value is zero, the samples in the set of samples of the primary signal in the interval [−L, L] may be taken. Thus, L samples on each side of the primary spectrum may be taken. The total number of samples may be 2L+1.

Similarly, a peak search may be performed to find a secondary/reference peak value in the secondary/reference spectrum, which is the detected maximum secondary/reference signal value, as depicted at 404. The secondary/reference signal 402 may be sampled to produce a set of samples of the secondary signal. L samples may be taken around the secondary/reference peak value of the secondary/reference signal. For example, each of the set of samples of the secondary/reference signal may have a corresponding index. Assuming an index of the secondary peak value is zero, the samples in the set of samples of the secondary/reference signal in the interval [−L, L] may be taken.

As depicted at 405, the set of samples of the primary signal and the set of samples of the secondary signal may be convolved to form a convolution signal in the interval [−L, L]. In one example, the set of samples of the primary signal and the set of samples of the secondary/reference signal may be correlated to form a correlation signal in the interval [−L, L]. The index of the maximum or peak value of the convolution or correlation signal may be used to refine the location of the peaks of the primary signal and/or the secondary signal. The maximum or peak value of the convolution or correlation signal may indicate the point where the primary signal and the secondary/reference signal are most similar. Because the primary signal or the secondary/reference signal may have some measurement errors due to mirror Doppler spreading, by convolving or correlating the primary signal and the secondary/reference signal, the measurement errors due to mirror Doppler spreading may be reduced or compensated. In this way, the detection accuracy of the peak frequency may be improved. Thus, more accurate frequency and energy measurements may be achieved, thereby increasing the accuracy in range, velocity, and reflectivity measurements of the target.

In one situation, the convolution/correlation peak falls at the sample zero ($\Delta=0$), where $\Delta$ is the corresponding index of the convolution/correlation peak value. When the index of the convolution/correlation peak value is the same as the first peak index, the primary signal and the secondary/reference signal may be most similar where they already are in terms of frequency. Thus, the detection cannot be refined. The detection accuracy may not be improved any further.

In another situation, the index of the convolution peak value is not the same as the first peak index zero, which indicate that one of the primary spectrum or the secondary spectrum may be offset by the other due to the noise such that the primary spectrum and the secondary spectrum are not aligned. Then, the peak of the primary signal 411 and/or the peak of the secondary signal 412 may be refined based on the difference between the index of the convolution peak value and the first peak index, such that the primary spectrum and the secondary spectrum may be better aligned to improve the detection accuracy. For example, when the convolution/correlation peak falls at location+2 ($\Delta=+2$), which indicate that one of the primary spectrum or the secondary spectrum may be offset by 2 samples due to the noise. Then the primary signal 411 and the secondary signal 412 may be refined.

In one embodiment, the index of the max value of the convolution signal maybe be used to refine the location of the primary and secondary peaks as below:

$$P=\hat{p}+\Delta/2 \quad (1)$$

$$S=\hat{s}+\Delta/2 \quad (2)$$

where $\hat{p}$, $\hat{s}$ denote the detected peak location for the primary signal (primary spectrum) and the secondary signal (secondary spectrum), and P, S denote the refined peak location for the primary signal and the secondary signal. The peak location may refer to the frequency corresponding to the maximum signal value. The detected peak location for the primary/secondary signal may refer to the frequency corresponding to the detected maximum signal value of the primary/secondary signal. The refined peak location for the primary/secondary signal may refer to the frequency corresponding to the refined maximum signal value of the primary/secondary signal. For example, if the convolution/correlation peak falls at location+2 ($\Delta$=+2), the peak of the primary signal 411 and/or the peak of the secondary signal 412 may be refined by shifting by $\Delta/2$=+1.

FIGS. 5A-5C are diagrams illustrating an example of convolution of a primary signal and a secondary signal of a LiDAR system according to embodiments of the present disclosure. As depicted in FIG. 5A, the primary signal is detected and sampled to form a primary spectrum 500*a*. The peak value 501*a* of the primary signal may be searched and detected. In this example, 10 samples on each side of the peak value 501*a* of the primary signal peak may be selected. As depicted in FIG. 5B, the secondary signal is detected and sampled to form a secondary spectrum 500*b*. The peak value 501*b* of the secondary signal may be searched and detected. In this example, 10 samples on each side of the peak value 501*b* of the secondary signal peak may be selected.

In this example, the primary and secondary spectra 500*a*, 500*b* are identical, except that the primary peak 501*a* is corrupted by a noisy sample (the detected peak value at the index 0). As a result, the primary spectrum 500*a* appears shifted by two samples (e.g., two indexes) with respect to the secondary spectrum 500*b*.

FIG. 5C depicts the result of the convolution between the primary spectrum 500*a* and the secondary spectrum 500*b*, which has a convolution peak 501*c* at ($\Delta$=+2), with a corresponding index of +2. The convolution peak is the point where the two spectra are most correlated (similar). Using the location of the convolution peak ($\Delta$=2), the estimated peak of the primary signal and the peak of the secondary signal may be refined by adding $\Delta/2$=+1, as illustrated in equations (1) and (2) above.

Figure 6:
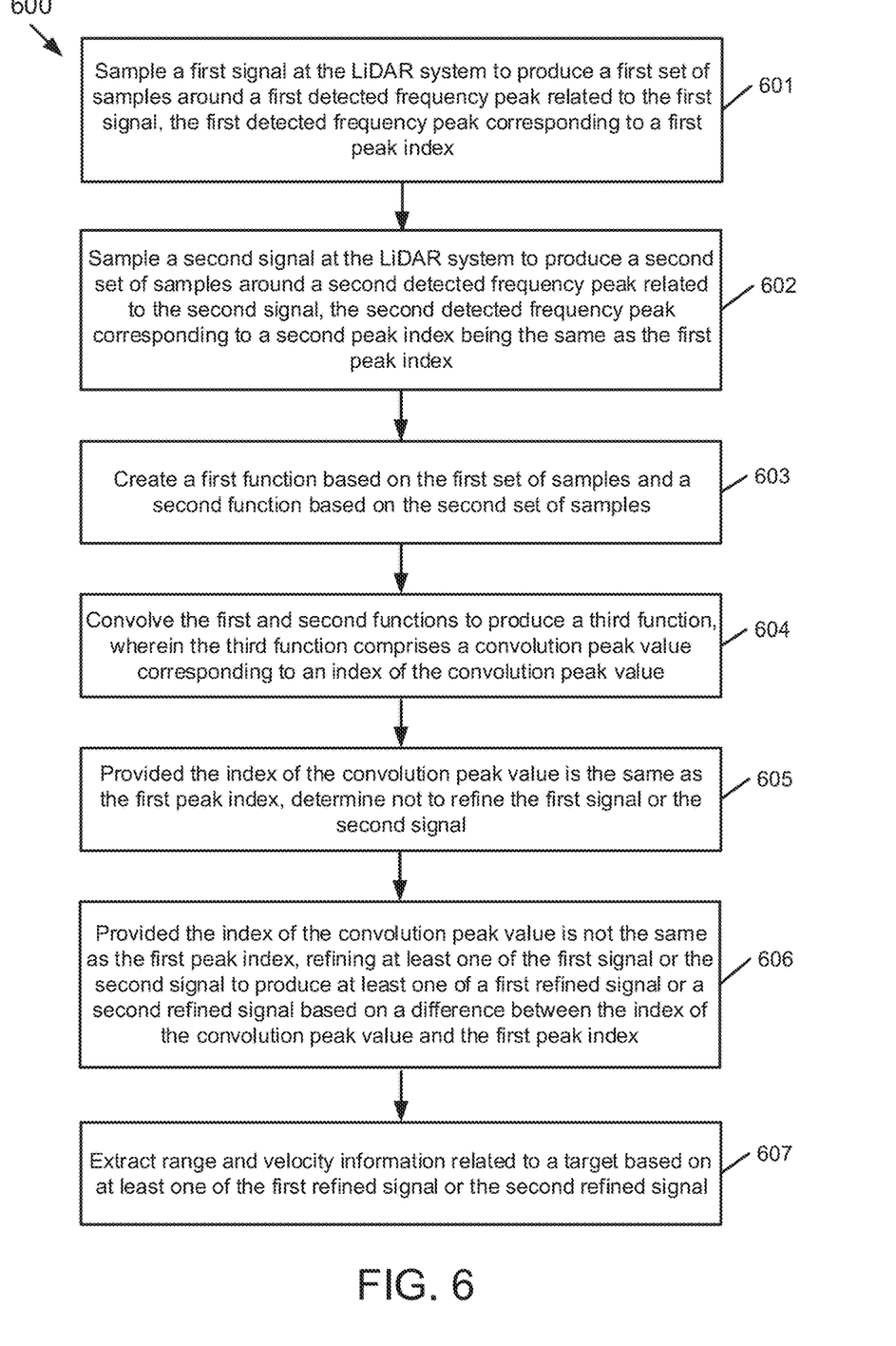
FIG. 6 is a flow diagram illustrating an example of a process of refining a signal by convolution in a LiDAR system according to embodiments of the present disclosure.

FIG. 6 is a flow diagram illustrating an example of a process 600 of refining a signal by convolution in a LiDAR system according to embodiments of the present disclosure. Process 600 may be performed by processing logic which may include software, hardware, or a combination thereof. The software may be stored on a non-transitory machine readable storage medium (e.g., on a memory device). For example, the process 600 may be performed by the correlator module 140 in the signal processing unit 112 of the LiDAR system 100, as illustrated in FIG. 1A-FIG. 1C. By this process, the mirror induced Doppler spreading may be compensated, and the detection accuracy may be improved. Thus, more accurate frequency and energy measurements may be achieved, thereby increasing the accuracy in range, velocity, and reflectivity measurements of the target. For example, range and velocity may be derived from x-axis (frequency) information, while reflectivity may be derived from the y-axis (energy) information.

At block 601, a first signal is sampled at the LiDAR system to produce a first set of samples around a first detected frequency peak related to the first signal, where the first detected frequency peak corresponds to a first peak index.

At block 602, a second signal is sampled at the LiDAR system to produce a second set of samples around a second detected frequency peak related to the second signal, where the second detected frequency peak corresponds to a second peak index which is the same as the first peak index.

At block 603, a first function based on the first set of samples and a second function based on the second set of samples are created.

At block 604, the first and second functions are convolved to produce a third function, where the third function comprises a convolution peak value corresponding to an index of the convolution peak value.

At block 605, provided the index of the convolution peak value is the same as the first peak index, it is determined not to refine the first signal or the second signal.

At block 606, provided the index of the convolution peak value is not the same as the first peak index, at least one of the first signal or the second signal is refined to produce at least one of a first refined signal or a second refined signal based on a difference between the index of the convolution peak value and the first peak index.

At block 607, range and velocity information related to a target is extracted based on at least one of the first refined signal or the second refined signal.

In one embodiment, the first and second signals are transmitted using a same optical source.

In one embodiment, the first and second signals are transmitted using different optical sources.

In one embodiment, the first signal comprises an up-chirp signal and the second signal comprises a down-chirp signal.

In one embodiment, refining at least one of the first signal or the second signal to produce a first refined signal or a second refined signal based on a difference between the index of the convolution peak value and the first peak index comprises shifting at least one of the first peak index or the second peak index by a half of the difference between the index of the convolution peak value and the first peak index.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A method for determining range and velocity information related to a target in a light detection and ranging (LiDAR) system, the method comprising:
sampling a first signal at the LiDAR system to produce a first set of samples around a first detected frequency peak related to the first signal, the first detected frequency peak corresponding to a first peak index;
sampling a second signal at the LiDAR system to produce a second set of samples around a second detected frequency peak related to the second signal, the second detected frequency peak corresponding to a second peak index being the same as the first peak index;
creating a first function based on the first set of samples and a second function based on the second set of samples;
convolving the first and second functions to produce a third function, wherein the third function comprises a convolution peak value corresponding to an index of the convolution peak value;
provided the index of the convolution peak value is the same as the first peak index, determining not to refine the first signal or the second signal;
provided the index of the convolution peak value is not the same as the first peak index, refining at least one of the first signal or the second signal to produce at least one of a first refined signal or a second refined signal based on a difference between the index of the convolution peak value and the first peak index; and
extracting range and velocity information related to a target based on at least one of the first refined signal or the second refined signal.

2. The method of claim 1, further comprising transmitting the first and second signals using a same optical source.

3. The method of claim 1, further comprising transmitting the first and second signals using different optical sources.

4. The method of claim 1, wherein the first signal comprises an up-chirp signal and the second signal comprises a down-chirp signal.

5. The method of claim 1, wherein refining at least one of the first signal or the second signal to produce a first refined signal or a second refined signal based on a difference between the index of the convolution peak value and the first peak index comprises shifting at least one of the first peak index or the second peak index by a half of the difference between the index of the convolution peak value and the first peak index.

6. A light detection and ranging (LiDAR) system, comprising:
a processor; and
a memory to store instructions that, when executed by the processor, cause the system to:
sample a first signal at the LiDAR system to produce a first set of samples around a first detected frequency peak related to the first signal, the first detected frequency peak corresponding to a first peak index;
sample a second signal at the LiDAR system to produce a second set of samples around a second detected frequency peak related to the second signal, the second detected frequency peak corresponding to a second peak index being the same as the first peak index;
create a first function based on the first set of samples and a second function based on the second set of samples;
convolve the first and second functions to produce a third function, wherein the third function comprises a convolution peak value corresponding to an index of the convolution peak value;
provided the index of the convolution peak value is the same as the first peak index, determine not to refine the first signal or the second signal;
provided the index of the convolution peak value is not the same as the first peak index, refine at least one of the first signal or the second signal to produce at least one of a first refined signal or a second refined signal based on a difference between the index of the convolution peak value and the first peak index; and
extract range and velocity information related to a target based on at least one of the first refined signal or the second refined signal.

7. The system of claim 6, wherein the system is further to transmit the first and second signals using a same optical source.

8. The system of claim 6, wherein the system is further to transmit the first and second signals using different optical sources.

9. The system of claim 6, wherein the first signal comprises an up-chirp signal and the second signal comprises a down-chirp signal.

10. The system of claim 6, wherein the system is to shift at least one of the first peak index or the second peak index by a half of the difference between the index of the convolution peak value and the first peak index.

11. A light detection and ranging (LiDAR) system, comprising:
a first optical source to transmit a portion of a first light signal towards a target;
a second optical source to transmit a portion of a second light signal towards a target;
an optical receiver to receive a first return signal from the target based on the first light signal and a second return signal from the target based on the second light signal,
a circuitry; and
a memory to store instructions that, when executed by the circuitry, cause the system to:
sample the first return signal at the LiDAR system to produce a first set of samples around a first detected frequency peak related to the first return signal, the first detected frequency peak corresponding to a first peak index;
sample the second return signal at the LiDAR system to produce a second set of samples around a second detected frequency peak related to the second return signal, the second detected frequency peak corresponding to a second peak index being the same as the first peak index;

create a first function based on the first set of samples and a second function based on the second set of samples;

convolve the first and second functions to produce a third function, wherein the third function comprises a convolution peak value corresponding to an index of the convolution peak value;

provided the index of the convolution peak value is the same as the first peak index, determine not to refine the first return signal or the second return signal;

provided the index of the convolution peak value is not the same as the first peak index, refine at least one of the first return signal or the second return signal to produce at least one of a first refined return signal or a second refined return signal based on a difference between the index of the convolution peak value and the first peak index; and extract range and velocity information related to a target based on at least one of the first refined return signal or the second refined return signal.

12. The system of claim 11, wherein the first optical source and the second optical source is a same optical source.

13. The system of claim 11, wherein the first optical source and the second optical source are two different optical sources.

14. The system of claim 11, wherein the first return signal comprises an up-chirp signal and the second return signal comprises a down-chirp signal.

15. The system of claim 11, wherein the system is to shift at least one of the first peak index or the second peak index by a half of the difference between the index of the convolution peak value and the first peak index.

* * * * *